Patented Oct. 12, 1948

2,451,272

UNITED STATES PATENT OFFICE 2,451,272

ACTIVATION OF ANION EXCHANGERS IN SUGAR PURIFICATION

William A. Blann, Stamford, Conn., assignor to American Cyanamid Company, New York, N. Y., a corporation of Maine No Drawing. Application October 27, 1945, Serial No. 625,101

3 Claims. (Cl. 127—46)

This invention relates to the regeneration or reactivation of anion active materials and more particularly, to the reactivation of such materials when used in the purification of an aqueous solution containing a sugar.

When anion active materials (sometimes called "anion exchangers" or "anion active resins") are used in the purification of aqueous solutions of sugars particularly the natural juices derived from sugar cane, sorghum, pineapple juice, apple juice, citrus fruit juices, beets, etc., it has been found that the activity or capacity of the anion active resins decreases substantially when used for the removal of anions and regenerated from one to several times. This phenomenon is particularly noticeable with those solutions or juices which contain coloring matter and none of the alkaline regenerants ordinarily employed in the regeneration or reactivation of anion exchangers are effective to bring the capacity thereof up to about its original value. Furthermore, none of the alkaline regenerants will remove a certain part of the coloring matter from the anion exchangers when coloring matter occurs in the solution which is being treated with the anion exchangers.

An object of the present invention is to provide a means of reactivating anion active resins.

Another object of the present invention is to provide a means of rendering a used anion active resin more active in the removal of coloring matters, such as those occurring in natural plant juices, especially those occurring in natural sugar cane juices and sugar beet juices.

These and other objects are attained by treating an anion active material after it has been used one or more times with a dilute solution of a strong acid. It is preferable that the acid be monobasic, since such acids appear to have somewhat higher activity in the reactivation of the anion exchangers. While there is no definite limit on the concentration of acid which may be used, it is generally found desirable to use concentrations varying from 0.1 to 10%, although higher concentrations of acid, e. g., up to 20% also give good results.

The following example in which the proportions are in parts by weight, except as otherwise indicated, is given by way of illustration and not in limitation. The analyses and other data given herein are all based upon the assumption that the cations and anions have an equivalent weight of 50.

Example 1

A system comprising two pairs of ion exchangers, one of each pair being an anion exchanger and the other being a cation exchanger, is used in this example. Each of the ion exchangers contains about 3½ cubic feet of resin. The anion exchanger is one prepared in accordance with the Swain Patent No. 2,285,750, and it is a condensation product of melamine, guanidine nitrate and formaldehyde. The cation exchanger is one prepared in accordance with Example 5 of the Thurston Patent No. 2,372,233. A raw sugar cane juice is centrifuged and then passed through the system of ion exchangers just as described. When the exchangers are exhausted to the desired degree, and the sugar solution is recovered from the system, the beds of ion exchangers are back-washed with water and then regenerated. The cation exchangers may be regenerated with about 15 pounds of sulfuric acid, diluted with water to make a solution having a concentration of about 2% acid, while the anion exchangers may be regenerated with about 15 pounds of sodium hydroxide diluted to a concentration of about 2%. Inasmuch as the last pair of ion exchangers is not completely exhausted when the first pair of exchangers is exhausted, the proportions of regenerants employed for these beds may be reduced somewhat. Accordingly, the latter beds may be regenerated with about 8½ pounds of sulfuric acid for the cation exchanger and 8½ pounds of sodium hydroxide for the anion exchanger in order to economize on the regenerants. The regenerating solution flowing from the anion-active materials is a dark coffee color.

After regeneration, the ion exchangers are rinsed to remove the regenerants adhering thereto and the cycle may be repeated. The capacity of the anion exchangers falls off gradually with repeated cycles, and the color absorption from the sugar juice also decreases in succeeding cycles. After about 10 to 15 cycles, the anion exchangers are given a preliminary treatment after back-washing and before regeneration. They are treated with a strong acid, preferably hydrochloric acid or sulfuric acid. Thus the anion exchanger may be treated with about 20 pounds of sulfuric acid diluted with water to a concentration of about 5% acid. The acid flowing from the anion exchanger is of a very dark greenish color quite different in appearance from the dark coffee-colored effluent flowing from the system when the sodium hydroxide regenerant is passed through the exchanger. After rinsing, the anion exchanger is regenerated in the usual manner with about 15 pounds of sodium hydroxide diluted with water to a concentration of about 2%.

Following the regeneration, the anion exchanger is rinsed in the usual manner, and the system is then ready for use to purify further quantities of sugar juices. Following the acid treatment of the anion exchangers, the sugar juices, being purified, are much lighter in color than those which were purified immediately prior to the acid treatment. Furthermore, the anion exchanger itself is quite light in color after the acid treatment as compared to its appearance before the acid treatment.

While both of the anion exchangers in the aforementioned type of system may be acid treated, it is sometimes more economical to treat only the first of the anion exchangers. By treating only one of the anion exchangers in the aforementioned manner, the over all anion capacity of the system may be increased from about 50% to about 60% after the resins have been employed in about 10 or 15 cycles. Furthermore, the removal of anions from the sugar solution being purified is thereby increased from about 70% to about 100%. This shows the marked improvement obtained in accordance with my invention, and it also shows the surprising results which accompany the use of the acid in reactivating the anion exchangers.

In the purification of beet juices the use of my invention is especially desirable since the anion resins apparently take up a large amount of a colloidal material which is not removed by alkaline regeneration. It may be necessary or desirable to use the acid regeneration in each or after only a few cycles in the purification of beet juices.

Apparently, the anion active materials extract certain coloring materials and also possibly certain colloidal substances or acidic substances which cannot be removed from the anion active material by means of alkaline treatment ordinarily used in regeneration. In many cases, this has resulted in the conclusion that it was not economical to use anion exchangers in purifying sugar solutions or juices. However, by the use of my invention, the anion exchangers may be kept in a high degree of activity, and accordingly, the purification of aqueous solutions of sugar which contain large amounts of coloring materials or other impurities which tend to lower the capacity of anion exchangers is economical.

My invention is especially adapted for use in connection with the purification of solutions of sugar and particularly the raw sugar juices which contain coloring matter and various other impurities. In the purification of sugar cane juices, sorghum juices, beet juices, fruit juices, such as pineapple juice, apple juice, citrus fruit juices, grape juice, etc., my invention is of considerable value. Furthermore, the present invention is adapted for use in connection with the purification of glucose, amino acids, such as glycine, the amino butyric acids, the amino valeric acids, etc., aqueous solutions of formaldehyde, solutions of polyhydric alcohols such as those obtained by fermentation processes, acetaldehyde, butyraldehyde, ketones such as acetone, methyl ethyl ketone, petroleum distillates including gasoline and lubricating oils, halogenated hydrocarbons, unsaturated substances such as acrylonitrile, acrylic acid, acrylamide, methacrylic acid, methacrylamide, etc.

The anion exchangers may be activated with substances other than sodium hydroxide, for example, sodium carbonate, potassium carbonate, potassium hydroxide, etc. The substances are generally used in the form of an aqueous solution having a concentration of between 0.1% and 10%. The cation exchangers may be regenerated or activated by passing a dilute solution of hydrochloric acid, sulfuric acid or other strong acids through them preferably in the form of aqueous solutions containing about 0.1%–10%.

The acid employed to treat the anion exchangers in accordance with this invention is preferably monobasic since such acids appear to have somewhat higher activity in the reactivation of the anion exchangers. However, sulfuric acid is often used in connection with the present invention because of economy and the lack of corrosive properties characteristic of such acids as hydrochloric acid. Other acids which are useful in accordance with this invention are acetic, formic, oxalic, phosphoric acids, etc. Acids at least as strong as acetic acid are preferred.

While the acid reactivation of the anion exchangers in accordance with this invention may be carried out after each use of the resin, it is generally desirable for economic reasons to reactivate with acid only after several cycles or more. The frequency of the acid reactivation of the anion exchangers will be determined to some extent by the nature of the impurities in the fluids being purified and also by the concentration of those impurities. In the purification of cane sugar juices, it is believed that for economical operation the acid reactivation should be carried out after about 10 or 15 cycles.

In place of part or all of the anion active resin used in the example other anion active materials may be substituted. Among these are the aldehyde condensation products of m-phenylene diamine, biguanide, guanyl urea, substituted guanidines such as methyl guanidine, substituted biguanides, such as phenyl biguanide, polyamines preferably the polyethylene polyamines, etc. Such condensation products are preferably formaldehyde condensation products although other aldehyde condensation products may be used if desired. Examples of other aldehydes are furfural, acrolein, benzaldehyde, etc. The active resins, such as those prepared from guanidine, guanyl urea, biguanide and other materials which do not form sufficiently insoluble condensation products with formaldehyde for most practical purposes, are preferably insolubilized with suitable formaldehyde reactive materials, e. g., urea, thiourea, the aminotriazines (especially melamine and the guanamines which react with formaldehyde to produce insoluble products), etc. The anion active resins prepared from guanidine, guanyl urea, biguanide, etc., may be prepared in the same general manner as described in U. S. Patents Nos. 2,251,234 and 2,285,750. Usually it is convenient to use the salts of the bases but the free bases may also be used. Examples of suitable salts for use in the preparation of anion active resins are guanidine carbonate, guanidine sulfate, biguanide sulfate, biguanide nitrate, guanyl urea sulfate, guanyl urea carbonate, etc. U. S. Patents Nos.

2,251,234 and 2,285,750 describe methods of preparing many anion active resins of the aforementioned types.

Other anion exchangers which may be employed are those obtained from epichlorohydrin and polyamines in accordance with the procedure described in application Serial No. 616,644, filed September 15, 1945.

Examples of suitable cation active materials, other than the one used in the above example, which may be operated on the hydrogen cycle, and which may be used with the anion active resins are: aldehyde condensation products of alpha-furyl substituted organic sulfonates such as those disclosed in U. S. Patent No. 2,373,152, polyhydric phenol-aldehyde condensation products such as the catechol-tannin-formaldehyde condensation products, aromatic sulfonic acid-formaldehyde condensation products (as described in U. S. Patent No. 2,204,539), the carbonaceous zeolites, i. e., the sulfated or sulfonated carbonaceous materials such as coal, peat, lignite, etc. Any of these materials may be operated on the hydrogen cycle and the are therefore suitable for use in accordance with my invention in the purification of liquids. Broadly speaking these substances may be termed "hydrogen zeolites." The activation of the cation active materials with an acid and the exchange or reaction of the hydrogen ion of said acid during the purification process is known as "the hydrogen cycle."

I claim:

1. In a process which comprises removing anions from an aqueous solution containing a sugar by passing said solution through an anion active resin until said resin no longer removes ions to the desired degree, the steps which include thereafter contacting said resin with an aqueous solution containing about 0.1–20% of a strong acid selected from the group consisting of hydrochloric acid and sulfuric acid and regenerating said resin with an alkaline substance.

2. In a process which comprises passing a raw sugar juice through a system including at least one anion exchanger until said exchanger no longer removes anions to the desired degree, the steps which include thereafter treating the anion exchanger with a dilute solution containing about 0.1–20% of a strong acid selected from the group consisting of hydrochloric acid and sulfuric acid, and then regenerating the resin by treatment with an alkaline solution.

3. In a process which comprises centrifuging a raw sugar juice, passing it through a system comprising at least one anion active resin until said resin no longer removes anions to the desired degree, regenerating said resin with a dilute alkaline solution and repeating this cycle until the capacity of said anion active resin for the removal of anions from said juice has substantially decreased, the steps which include treating said anion active resin with a dilute solution containing about 0.1–20% of a strong acid selected from the group consisting of hydrochloric acid and sulfuric acid and then regenerating said resin with an alkaline solution whereby the capacity of said resin for the absorption of anions from said juice is substantially increased and whereby the ability of the same resin to remove coloring matter from said juice is substantially increased.

WILLIAM A. BLANN.

REFERENCES CITED

The following references are of record in the file of this patent:

UNITED STATES PATENTS

| Number | Name | Date |
| --- | --- | --- |
| 2,251,234 | Swain | July 29, 1941 |
| 2,402,960 | Gustafsen | July 2, 1946 |
| 2,403,177 | Gustafsen | July 2, 1946 |

FOREIGN PATENTS

| Number | Country | Date |
| --- | --- | --- |
| 116,691 | Australia | Mar. 25, 1943 |

OTHER REFERENCES

"Collectavit," by Kippeler & Radbruch, Int. Sugar Journal, October 1941, page 317.

Meyers, Synthetic Resin Ion Exchangers (Advances in Colloid Science), 1942, page 350.

Boyd, "Decolorizing Filter Aids," Ind. & Eng. Chem., June 1942; pages 744–748.